(12) United States Patent
Moreau-Cook et al.

(10) Patent No.: US 10,104,117 B2
(45) Date of Patent: Oct. 16, 2018

(54) IDENTIFYING USER BEHAVIOR IN A DISTRIBUTED COMPUTING SYSTEM

(71) Applicant: Microsoft Technology Licensing, LLC, Redmond, WA (US)

(72) Inventors: Aaron J. Moreau-Cook, Bothell, WA (US); Samuel Terrence Trim, Sammamish, WA (US); Yuxiang Xu, El Macero, CA (US); Aby John, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 233 days.

(21) Appl. No.: 15/052,344

(22) Filed: Feb. 24, 2016

(65) Prior Publication Data
US 2017/0244747 A1    Aug. 24, 2017

(51) Int. Cl.
*H04L 29/06* (2006.01)
*G06Q 10/10* (2012.01)
*H04L 12/58* (2006.01)

(52) U.S. Cl.
CPC ....... *H04L 63/1441* (2013.01); *G06Q 10/107* (2013.01); *H04L 51/00* (2013.01); *H04L 51/12* (2013.01)

(58) Field of Classification Search
CPC ..... H04L 63/1441; H04L 51/00; H04L 51/12; G06Q 10/107
USPC .......................................................... 726/22
See application file for complete search history.

(56) References Cited

U.S. PATENT DOCUMENTS

| | | | |
|---|---|---|---|
| 6,437,806 B1 * | 8/2002 | Iwasa ................... | G06Q 10/107 715/744 |
| 7,237,008 B1 * | 6/2007 | Tarbotton ............. | G06Q 10/107 709/206 |
| 7,908,328 B1 | 3/2011 | Hulten et al. | |
| 8,280,971 B2 | 10/2012 | Yu | |
| 8,380,976 B2 * | 2/2013 | Hirota .................... | H04L 51/14 370/428 |
| 8,719,940 B1 | 5/2014 | Higbee | |
| 8,892,661 B2 | 11/2014 | Ramarao et al. | |
| 8,938,511 B2 | 1/2015 | Christodorescu et al. | |

(Continued)

FOREIGN PATENT DOCUMENTS

JP     2001344177 A     12/2001

OTHER PUBLICATIONS

"Bulk Complaint Level values", Published on: Sep. 11, 2014 Available at: https://technet.microsoft.com/en-IN/library/dn759623%28v=exchg.150%29.aspx.

(Continued)

*Primary Examiner* — Dant B Shaifer Harriman
(74) *Attorney, Agent, or Firm* — Christopher J. Volkmann; Kelly, Holt & Christenson, PLLC

(57) ABSTRACT

A list of electronic mail (e-mail) accounts is extracted from an electronic mail system. A list of electronic mail accounts, with forwarding enabled, are identified as a set of collection accounts. A dropbox account is identified, from the collection accounts, as a destination e-mail account for the forwarded collection accounts. The collection accounts that forward to the dropbox account that has in excess of a threshold number of collection accounts forwarding to it, are identified as malicious e-mail collection accounts and are forwarded to a resolution system, for resolution.

19 Claims, 8 Drawing Sheets

(56) References Cited

U.S. PATENT DOCUMENTS

| | | | | |
|---|---|---|---|---|
| 8,955,106 | B2* | 2/2015 | Rihn | G06F 21/56 713/188 |
| 9,143,476 | B2* | 9/2015 | Dreller | G06Q 10/04 |
| 9,762,525 | B2* | 9/2017 | Chakra | H04L 51/28 |
| 2002/0138581 | A1* | 9/2002 | MacIntosh | G06Q 10/107 709/206 |
| 2004/0054742 | A1* | 3/2004 | Gruper | H04L 51/34 709/206 |
| 2004/0254996 | A1* | 12/2004 | Yabe | H04L 51/12 709/206 |
| 2008/0052364 | A1* | 2/2008 | Zhou | G06Q 10/107 709/206 |
| 2011/0258218 | A1* | 10/2011 | Hayes | G06Q 10/00 707/769 |
| 2012/0166263 | A1* | 6/2012 | Tsuboi | G06Q 30/02 705/14.16 |
| 2013/0067562 | A1* | 3/2013 | Davis | G06Q 10/107 726/14 |
| 2013/0074143 | A1* | 3/2013 | Bu | H04L 63/1416 726/1 |
| 2015/0033343 | A1* | 1/2015 | Jiang | H04L 63/1441 726/23 |
| 2015/0067833 | A1* | 3/2015 | Verma | H04L 63/1483 726/22 |
| 2015/0188874 | A1 | 7/2015 | Feinstein | |
| 2015/0195247 | A1* | 7/2015 | Onogawa | H04L 51/12 726/11 |
| 2015/0319185 | A1* | 11/2015 | Kirti | H04L 63/1416 726/23 |
| 2016/0344770 | A1* | 11/2016 | Verma | H04L 63/1483 |
| 2017/0230411 | A1* | 8/2017 | Starink | H04L 63/1441 |
| 2017/0244747 | A1* | 8/2017 | Moreau-Cook | H04L 51/12 |

OTHER PUBLICATIONS

"Email forwarding", Published on: May 14, 2015 Availavle at: https://support.google.com/domains/answer/3251241?hl=en.

"Fighting Junk Email", Published on: Apr. 10, 2014 Available at: https://mail.live.com/mail/junkemail.aspx.

"1000 Forwarded Hotmail Accounts / Bulk Forwarded Hotmail Accounts", Retrieved on: Nov. 23, 2015 Available at: http://www.verifiedaccts.com/index.php?route=product/product&product_id=155.

Snyder, Bill, "Twitter's Fake Followers: Influence for Sale", Published on: Aug. 30, 2012 Available at: http://www.infoworld.com/d/the-industry-standard/twitters-fake-followers-influence-sale-201295.

Allen, Karma, "How a Fake Business Built an Awesome Online Reputation", Published on: Sep. 16, 2015 Available at: http://www.nbcnews.com/business/consumer/how-fake-business-built-awesome-online-reputation-n428546.

Considine, Austin, "Buy Your Way to Twitter Fans? You Bet", Published on: Aug. 27, 2012 Available at: http://seattletimes.com/html/entertainment/2018983928_twitter27.html.

Eddy, Nathan, "Facebook to Crack Down on Fake Likes", Published on: Sep. 3, 2012 Available at: http://www.eweek.com/c/a/Security/Facebook-to-Crack-Down-on-Fake-Likes-635873/.

Enzo, "6. Craigslist Posts $0.35 per ad / 30 ads per week", Published on: Mar. 8, 2013 Available at: https://forums.digitalpoint.com/threads/craigslist-posts-0-35-per-ad-30-ads-per-week.2642130/.

International Search Report and Written Opinion for International Patent Application No. PCT/US2017/018019, dated: May 8, 2017, date of filing: Feb. 16, 2017, 16 pages.

Tim McMichael: "Office 365: Determine accounts that have forwarding enabled.", TechNet, Apr. 19, 2015, Retrieved from the Internet: URL:https://blogs.technet.microsoft.com/timmcmic/2015/04/19/office-365-determine-accounts-that-have-forwarding-enabled/ Retrieved on: Apr. 25, 2017, 3 pages.

Anonymous: "Quick Tip Mapping mailboxes to forwarding contacts", www.telnetport25.com, Sep. 26, 2015, Retrieved from the Internet: URL:http://web.archive.org/web/20150926092951/http://www.telnetport25.com/2013/02/quick-tip-mapping-mailboxes-to-forwarding-contacts/ Retrieved on: Apr. 25, 2017, 6 pages.

* cited by examiner

IDENTIFYING USER BEHAVIOR IN A DISTRIBUTED COMPUTING SYSTEM

BACKGROUND

Computer systems are currently in wide use. Some computer systems provide on-line web services to a plurality of different users.

One example of such a computing system is an electronic mail system. Electronic mail (e-mail) systems often allow users to create electronic mail accounts by entering user-specific data, or other data, and to set various properties or functional characteristics of the account. By way of example, when a user sets up an e-mail account, the user may be provided with the ability to not only use the e-mail account for sending and receiving messages, but also to set various filtering and forwarding options. The filtering options may allow the user to set filter settings so that messages can be processed differently, depending on whether they meet filter criteria in the filter settings. For instance, the user may be able to set up an e-mail account and then set a forwarding option so that the newly-created e-mail account will forward all messages (or filtered messages, which are messages that pass any filter settings the user has set) to a second e-mail account.

There can be some incentives to use such a system maliciously. For instance, some networks (such as social networks) may require a user to have a unique e-mail account in order to set up a social network account. However, there may be incentives for a user to have multiple different social network accounts. Therefore, there may be an incentive for a single user to create multiple different e-mail accounts so the user can have multiple different social network accounts. If the number of multiple different e-mail accounts is a relatively large number of accounts, it can be difficult for the user to manage those accounts. Therefore, there may also be incentive for the user to forward all of those multiple e-mail accounts to a single e-mail account. The multiple accounts that are forwarded to the single account are referred to herein as collection accounts. The destination account that receives the forwarded messages from the collection accounts is referred to herein as a dropbox account.

Recently, spammers and abusers have created millions of malicious collection accounts and forwarded them to a relatively small number of dropbox accounts. The creation of these malicious collection accounts and dropbox accounts impacts the electronic mail services provided by service providers. Just setting up the accounts utilizes server system resources. Also, the forwarded messages from the collection accounts to the dropbox accounts can number many millions of e-mails messages. This increases the latency in an e-mail service offered by the service provider. This can cause delays in delivering e-mails for millions of legitimate users.

The discussion above is merely provided for general background information and is not intended to be used as an aid in determining the scope of the claimed subject matter.

SUMMARY

A list of electronic mail (e-mail) accounts is extracted from an electronic mail system. A list of electronic mail accounts, with forwarding enabled, are identified as a set of collection accounts. A dropbox account is identified, from the collection accounts, as a destination e-mail account for the forwarded collection accounts. The collection accounts that forward to the dropbox account that has in excess of a threshold number of collection accounts forwarding to it, are identified as malicious e-mail collection accounts and are forwarded to a resolution system, for resolution.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
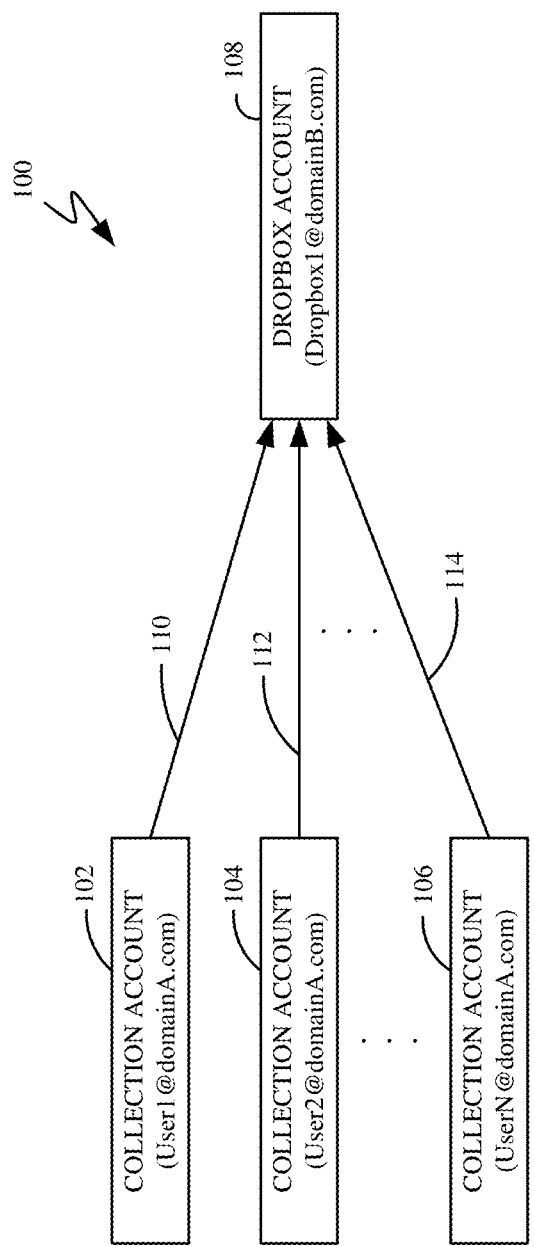
FIG. 1 is a block diagram illustrating one example of how collection accounts operate relative to dropbox accounts.

FIG. 1 is a block diagram of one example of an electronic mail (e-mail) system configuration 100. Configuration 100 shows a plurality of e-mail accounts (referred to as collection accounts) 102, 104 and 106. Accounts 102-106 are illustratively e-mail accounts that are configured to forward to a single destination (or dropbox) e-mail account 108. The arrows 110, 112 and 114 indicate that the collection accounts 102-106 have their forwarding status set to forward e-mails that are received at e-mail accounts 102-106 (or those received emails that pass a user-defined filter set by the creator of the collection account) to dropbox account 108.

It will be noted that, in one example, the collection accounts 102-106 and dropbox account 108 are all associated with the same domain. However, the collection accounts 102-106 may be associated with one domain, while dropbox account 108 is associated a different domain. Similarly, it may be that the collection accounts 102-106 are associated with different domains as well.

It can be seen from FIG. 1 that, if a single user sets up a plurality of different collection accounts 102-106, all of which forward to a relatively small number of dropbox accounts 108, this can deleteriously affect the operation of the computational resources that are providing the e-mail services. It is not unprecedented for a relatively small set of users to set up millions of malicious collection accounts that all forward to a very small number of dropbox accounts. Thus, the number of forwarded messages, that are forwarded from malicious collection accounts, can be tens of millions.

Figure 2:
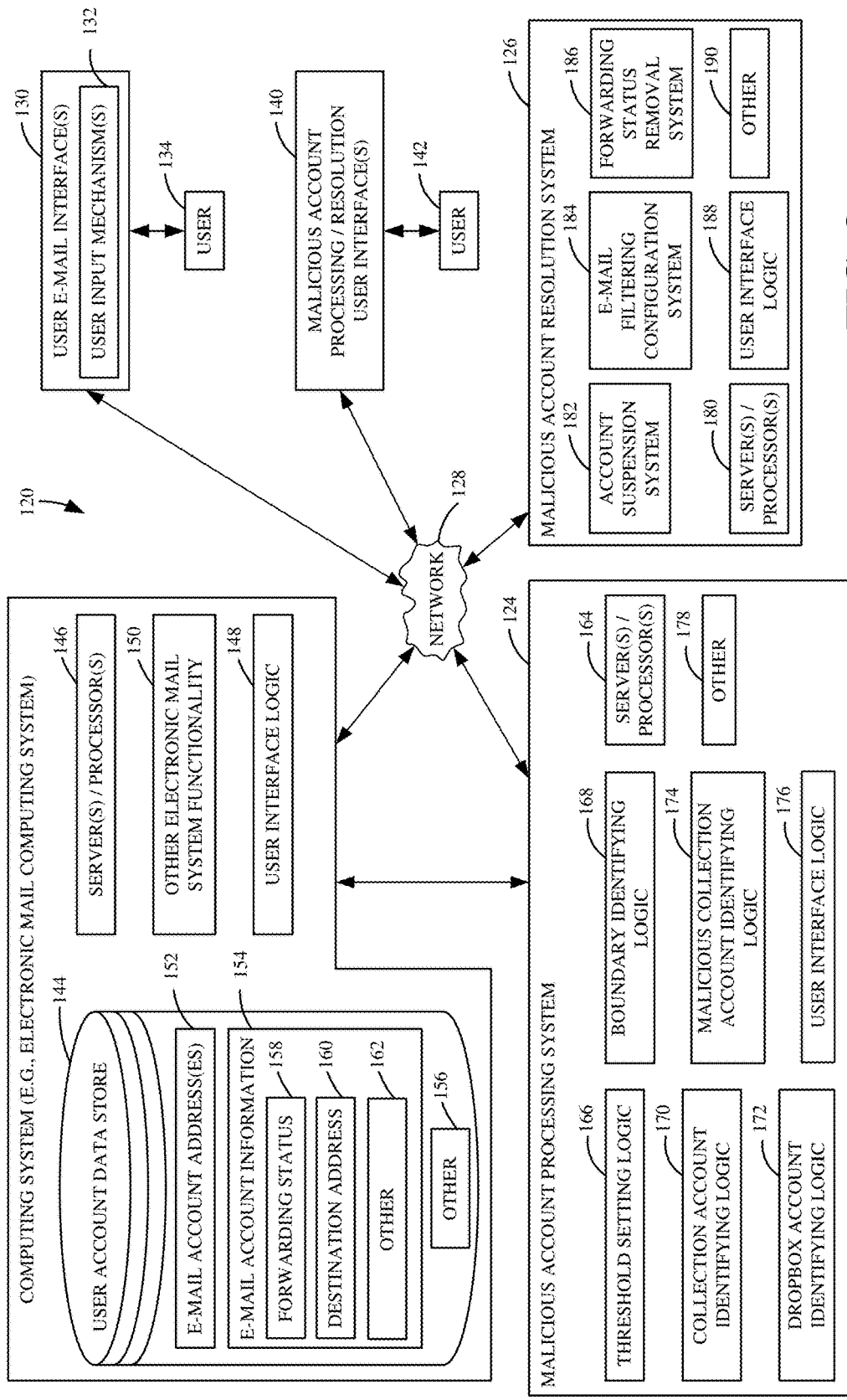
FIG. 2 is a block diagram of one example of a distributed computing system (e.g., an electronic mail (e-mail) computing system) architecture.

FIG. 2 shows one example of a computing system architecture (e.g., an e-mail computing system architecture) 120. Architecture 120 includes e-mail computing system 122, malicious account processing system 124, and malicious account resolution system 126. The systems are illustratively connected to one another either directly, or over a network 128. It should also be noted that systems 124 and 126 can be combined, and they can also be combined with system 122. However, the three systems are shown separately, and connected to one another, for the sake of example only.

In the example shown in FIG. 2, e-mail computing system 122 is shown generating e-mail user interfaces 130 with user input mechanisms 132 for interaction by user 134. User 134 can illustratively interact with user input mechanisms 132 in order to control and manipulate e-mail computing system 122. This can include, for instance, setting up e-mail accounts on system 122, using the e-mail accounts to send and receive messages, and setting various operational properties corresponding to those accounts. For instance, it may include setting the forwarding status of an e-mail account to forward to another, destination account. FIG. 2 also shows that, in one example, user 134 directly accesses e-mail system 122. However, user 134 can also utilize a user system (or client system) to access e-mail system 122 either directly, or over network 128.

FIG. 2 also shows that, in one example, one or more users 142 that use malicious account processing system 124 and malicious account resolution system 126 can access those systems through malicious account processing/resolution user interfaces 140. Interfaces 140 can also have user input mechanisms that are accessed by user 142 in order to control and manipulate one or more systems 124 and 126.

Before describing the operation of architecture 120 in more detail, some of the items in the various systems will first be described. FIG. 2 shows that, in one example, e-mail computing system 122 includes user account data store 144, one or more servers or processors 146, a set of user interface logic 148, and other electronic mail system functionality 150. User account data store 144 illustratively stores user account e-mail information for users of system 122, such as e-mail addresses 152, e-mail account information 154, and it can store other items 156 as well. The e-mail account information can include forwarding status information 158 that indicates whether the particular e-mail account is to forward messages. It can also include a destination address 160 that identifies the particular e-mail address that the e-mail account is to forward messages to. It can of course include a wide variety of other e-mail account information 162 as well.

In the example shown in FIG. 2, malicious account processing system 124 illustratively includes one or more processors or servers 164, threshold setting logic 166, boundary identifying logic 168, collection account identifying logic 170, dropbox account identifying logic 172, malicious collection account identifying logic 174, user interface logic 176, and it can include other items 178. As a brief overview, threshold setting logic 166 allows a user 142 to set various thresholds used in identifying malicious collection accounts (or it can automatically set those thresholds). Boundary identification logic 168 allows the user to identify a boundary of various e-mails (such as a domain name) that will be processed together with one another (or it can automatically identify the boundary). Collection account identifying logic 170 identifies e-mail accounts in e-mail computing system 122 that are set to forward messages to other accounts (referred to herein as collection accounts). Dropbox identifying logic 172 identifies dropbox accounts that receive forwarded messages from collection accounts. It will be noted that not all collection accounts (e-mail accounts with forwarding set) are considered to be malicious. Therefore, malicious collection account identifying logic identifies which of the collection accounts identified by logic 170 are considered to be malicious. User interface logic 176 illustratively generates user interfaces and responds to user inputs.

Malicious account resolution system 126 illustratively includes one or more servers or processors 180, account suspension system 182, e-mail filtering configuration system 184, forwarding status removal system 186, user interface logic 188, and it can include a wide variety of other items 190. Again, by way of overview, account suspension system 182 can be used to automatically or manually suspend malicious collection accounts identified by logic 174. E-mail filtering configuration system 184 can be used to automatically or manually reconfigure the malicious collection accounts so that the e-mails that they are forwarding, are filtered out, or are never sent. Forwarding status removal system 186 can be used to automatically or manually remove the forwarding status of the malicious collection accounts identified by logic 174, so they do not forward messages. All of these are only examples of different types of resolution actions that can be taken to resolve issues related to malicious collection accounts. A wide variety of others can be used as well.

Figure 3:
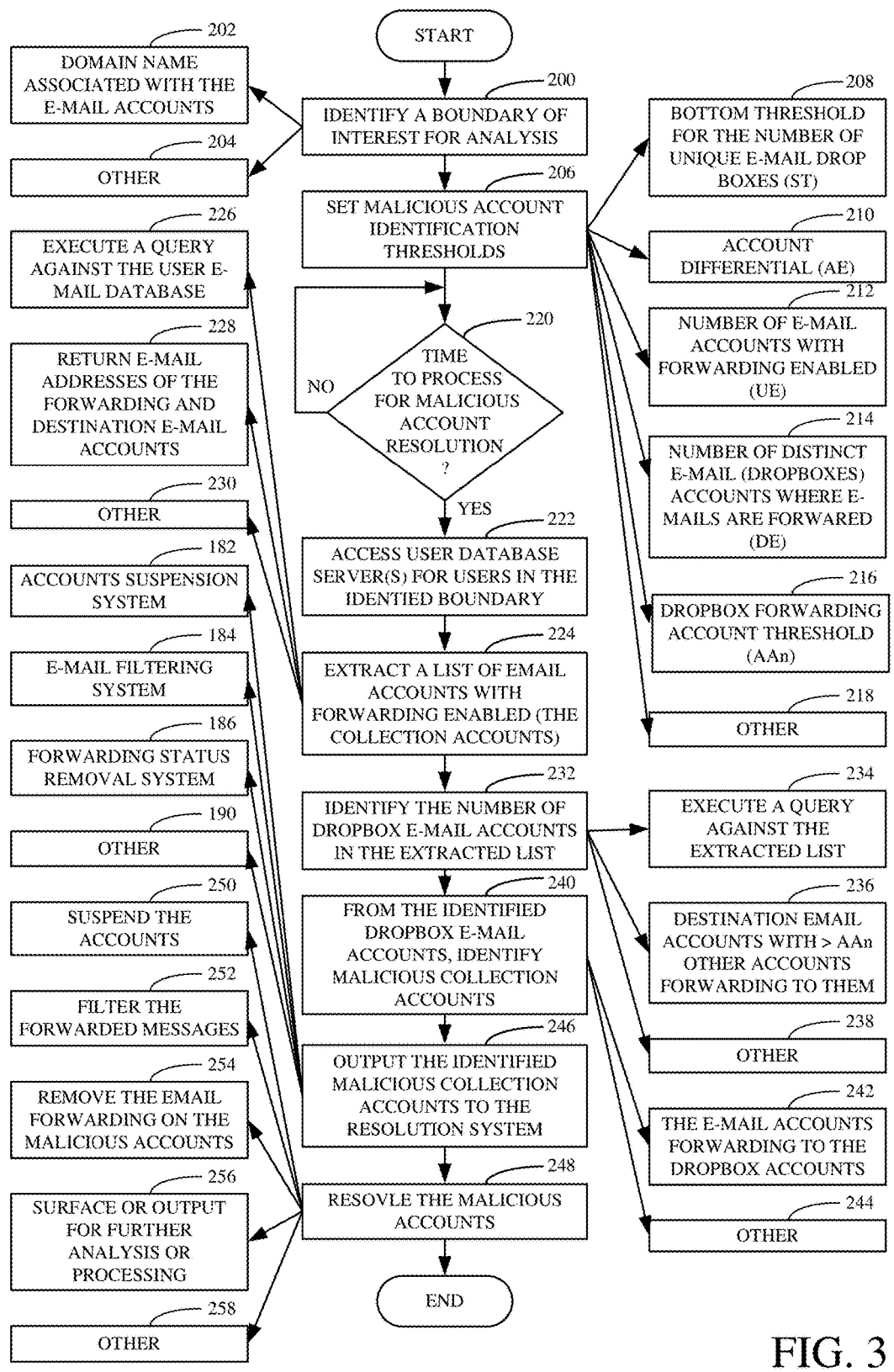
FIG. 3 is a flow diagram illustrating one example of the operation of the architecture shown in FIG. 2.

FIG. 3 is a flow diagram illustrating one example of the operation of architecture 120, shown in FIG. 2, in identifying and resolving malicious collection accounts. This can take a wide variety of different forms. In one example, boundary identifying logic 168 first identifies a boundary of interest for analysis. This is indicated by block 200. By way of example, the boundary of interest may be a domain name associated with a set of e-mail accounts, in data store 144. This is indicated by block 202. The boundary can be any other boundary that can be set to identify a set of e-mails (or e-mail data) from one or more user account data stores 144 that are to be analyzed for malicious accounts. This is indicated by block 204.

Threshold setting logic 168 can then initiate the setting of a set of malicious account identification thresholds. This is indicated by block 206 in FIG. 3. For instance, threshold setting logic 166 can analyze the e-mail accounts within the identified boundary, in order to set a plurality of different thresholds. The thresholds can be set manually or automatically (or a combination of manually and automatically) and are used in identifying malicious accounts.

The thresholds can take a wide variety of different forms. For instance, in one example, a static threshold (referred to herein as ST) is a static variable that identifies a bottom threshold for the number of unique e-mail dropboxes that are identified within the domain. This is indicated by block 208. In one example, this number is no lower than 1, but it may be set to a higher value as well, based on the particular application, customer needs, etc.

Another threshold value may be an account differential (AE) threshold. This is a value indicative of the total number of e-mail accounts in the boundary (e.g., the domain), divided by the number of accounts that have forwarding enabled. This is indicated by block 210.

Another value that is used in setting the thresholds may be the forwarding e-mail accounts value (UE). This is the number of e-mail accounts that currently have e-mail forwarding enabled, with the boundary. This is indicated by block 212. It will be noted that the UE value is used in setting the account differential (AE) value 210.

Another value that can be used in setting the thresholds is the distinct e-mail dropboxes (DE) value. This is the number of distinct e-mail dropboxes where the user accounts are forwarding to. This is indicated by block 214.

Once the values 208, 210, 212 and 214 are obtained or calculated, they can be used in setting a dropbox forwarding account threshold (referred to herein as AAn). This is indicated by block 216. The AAn threshold can be calculated as follows:

$$AAn = \left(\frac{ST}{GR}\right) \times AE \qquad \text{Eq. 1}$$

$$\text{Where } GR = \frac{UE}{DE}$$

Of course, this is only one example of how the AAn threshold can be set. A variety of other values or other thresholds can be calculated or set as well, and this is indicated by block 218 in FIG. 3.

Malicious account processing system 124 then determines whether it is time to analyze the information in the boundary identified in e-mail computing system 122 to identify malicious accounts and perform malicious account resolution. This is indicated by block 220 in FIG. 3. In one example, the operation is run, substantially continuously. In another example, it is run intermittently, or when various processing criteria are met. For example, the response time of e-mail system 122 can be monitored, and when it falls below a given threshold metric value, the malicious account processing can be performed. These are only examples.

Once it is time to perform the processing, then malicious account processing system 124 accesses user account data store 144 through servers or processors 146 in e-mail computing system 122. It accesses the account information for the electronic mail accounts within the identified boundary (e.g., within the domain name identified at block 200 above). Accessing this information is indicated by block 222 in FIG. 3. Collection account identifying logic 170 then extracts a list of e-mail accounts for which the forwarding status 158 indicates that forwarding in enabled. This is indicated by block 224 in FIG. 3. This can be done by executing a query against the user e-mail data store 144 to identify the information. This is indicated by block 226. The results returned can include the e-mail address of the e-mail account that is forwarding e-mails, and the address of the destination e-mail account as well. This is indicated by block 228. Of course, the list can be extracted in other ways 230 as well.

Table 1 shows one example of a set of results that can be returned.

TABLE 1

| emailAddress | forwardingEnabled | forwardingAddress |
| --- | --- | --- |
| user_0@contoso.com | TRUE | dropbox_0@domainz.com |
| user_1@contoso.com | FALSE | |
| user_2@contoso.com | TRUE | dropbox_0@domainz.com |
| user_3@contoso.com | TRUE | dropbox_0@domainz.com |
| user_4@contoso.com | FALSE | |
| user_5@contoso.com | FALSE | |
| user_6@contoso.com | TRUE | dropbox_0@domainz.com |
| user_7@contoso.com | TRUE | user_0@domainy.com |
| user_8@contoso.com | FALSE | |
| user_9@contoso.com | TRUE | user_1@domainy.com |

Of course, Table 1 is only one example of the information that might be returned. Others can be used as well.

Dropbox account identifying logic 172 then identifies the number of dropbox e-mail accounts identified in the extracted list. This is indicated by block 232. For instance, it may execute a query against the extracted list of e-mail accounts (which may be referred to as the inputDataSet) to identify how many accounts are associated with e-mail accounts (or dropboxes) that exceed the threshold AAn. Executing the query is indicated by block 234. Identifying destination e-mail accounts with more than AAn other accounts forwarding to them is indicated by block 236. The number of dropbox e-mail accounts can be identified in other ways 138 as well.

Table 2 shows one example of a code snippet which will identify the dropbox accounts.

TABLE 2

SELECT forwardingAddress,COUNT(*) AS count FROM inputDataSet
GROUP BY forwardingAddress
HAVING COUNT(*) > AAn
ORDER BY count DESC Again, of course, this is only one example. Other mechanisms can be used instead.

Once the identified dropbox e-mail accounts are identified, then the malicious collection account identifying logic 174 identifies which of the collection accounts are considered to be malicious collection accounts, from the accounts forwarding to the identified dropbox e-mail accounts. This is indicated by block 240 in FIG. 3. In one example, it executes a query against the list of dropbox e-mail accounts to identify all collection e-mail accounts that are forwarding to the dropbox e-mail accounts. Recall that the dropbox e-mail accounts have been defined as those that are receiving forwarded messages from a number of collection accounts that is greater than the threshold AAn. Assume, for the sake of example, that AAn is set to 50. The dropbox accounts would be identified as those e-mail accounts that are receiving forwarded messages from in excess of 50 other e-mail accounts. Malicious collection account identifying logic 174 thus identifies the collection e-mail accounts that are forwarding to dropbox accounts. This is indicated by block 242. The malicious collection accounts can be identified in other ways 244 as well.

Table 3 is one example of a code snippet that can be used to identify the malicious collection accounts, from the identified dropbox accounts.

TABLE 3

SELECT emailAddress FROM inputDataSet
WHERE forwardingAddress IN
(SELECT forwardingAddress
FROM inputDataSet
GROUP BY forwardingAddress
HAVING COUNT(*) > AAn)

Malicious collection account identifying logic 174 then outputs the identity of the malicious collection accounts to malicious account resolution system 126, that can resolve those accounts in a wide variety of different ways. This is indicated by block 246 in FIG. 3.

For example, an identifier identifying the malicious accounts can be sent to account suspension system 182, e-mail filtering system 184, forwarding status removal system 186, or other resolution system 110.

The malicious accounts are then resolved, as indicated by block 248. Account suspension system 182 can receive the identity of a malicious e-mail account and automatically suspend it within e-mail computing system 122. This is indicated by block 250. E-mail filtering configuration system 184 can receive the identity of a malicious e-mail account and automatically set filtering for the forwarded messages from that account, so that they are not sent. This is indicated by block 252. Forwarding status removal system 186 can receive the identity of a malicious account, and change the forwarding status information 158 associated with that account, so that it no longer forwards its messages. This is indicated by block 254. The identity of the malicious e-mail accounts can also be surfaced or output in other ways for further analysis or processing by other systems. This is indicated by block 256. Resolution can be accomplished in still other ways as well, and this is indicated by block 258.

It will be noted that the system can also be applied iteratively. For instance, the value of threshold AAn can be changed and applied iteratively to the data in data store 144.

It can be seen that the processing described herein that identifies and resolves malicious e-mail accounts greatly enhances the security and reliability of the e-mail system itself. It also greatly reduces the latency of the operation of the e-mail system, because it can have a very beneficial effect on the overall network bandwidth used by the e-mail system in sending messages. It greatly enhances the ability to reduce abuses of the system and thus increases customer experience and trust in the system as well.

It should also be noted that, while the present discussion has proceeded with respect to malicious e-mail accounts, it could just as easily be applied in other contexts. For instance, it can be applied to a computing system where other accounts can be obtained and used by users such as distributed computing systems, where IP addresses are obtained and used and where that usage can be malicious. It can be used in a wide variety of other ways as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present description has also used the term "automatically" when referring to performing a corresponding step or function. In one example, this means that the corresponding step or function is performed without further user input, except perhaps to authorize or initiate the step or function.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
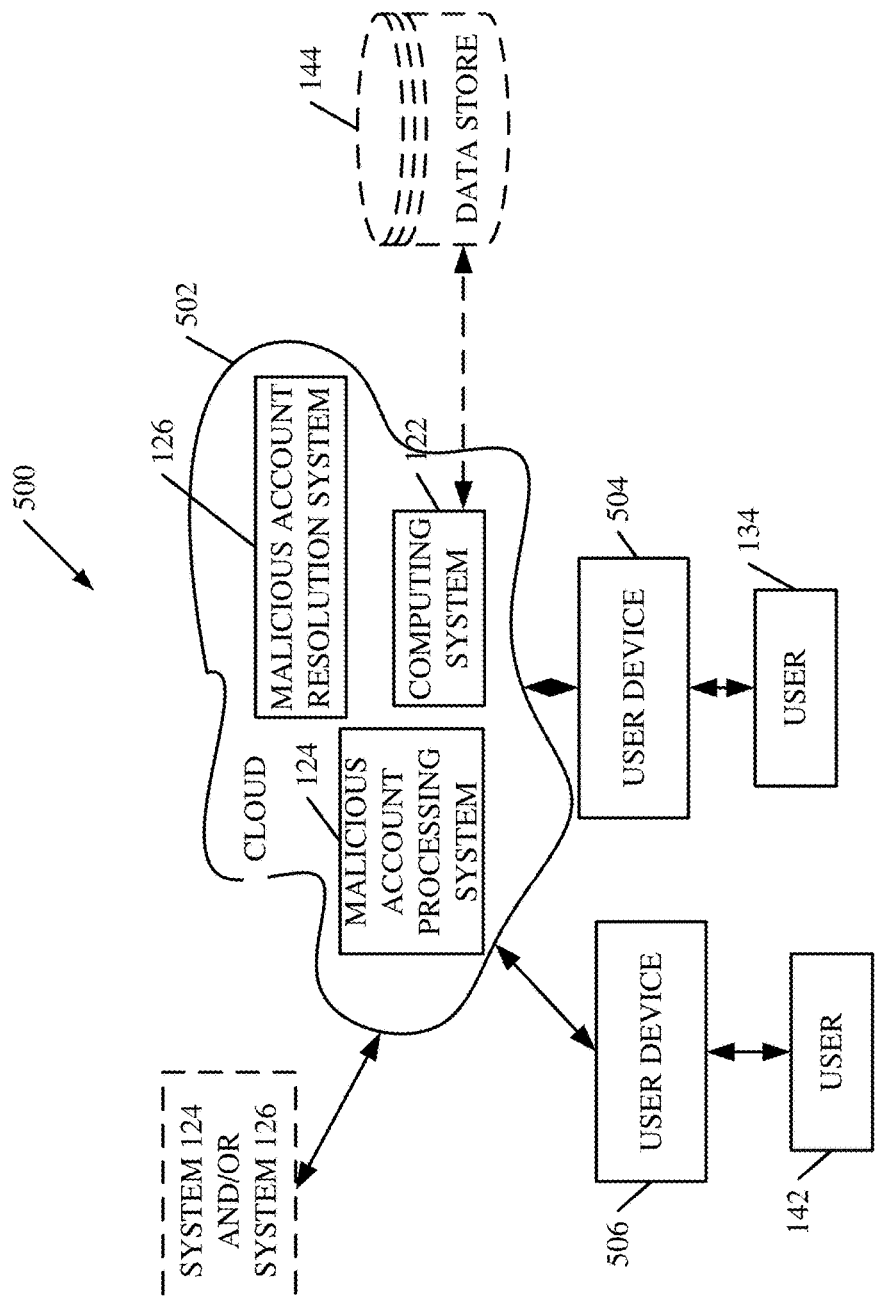
FIG. 4 is a block diagram illustrating one example of the architecture shown in FIG. 2, deployed in a cloud computing architecture.

FIG. 4 is a block diagram of architecture 120, shown in FIG. 2, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 120 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 2 and they are similarly numbered. FIG. 4 specifically shows that e-mail system 122, malicious account processing system 124 and malicious account resolution system 126 can all be located in cloud 502 (which can be public, private, or a combination where portions are public while others are private). Therefore, users 134 and 142 can use user devices 504 and 506 to access those systems through cloud 502.

FIG. 4 also depicts another example of a cloud architecture. FIG. 4 shows that it is also contemplated that some elements of architecture 120 are disposed in cloud 502 while others are not. By way of example, data store 144 can be disposed outside of cloud 502, and accessed through cloud 502. In another example, either or both of systems 124 and 126 can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 120, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
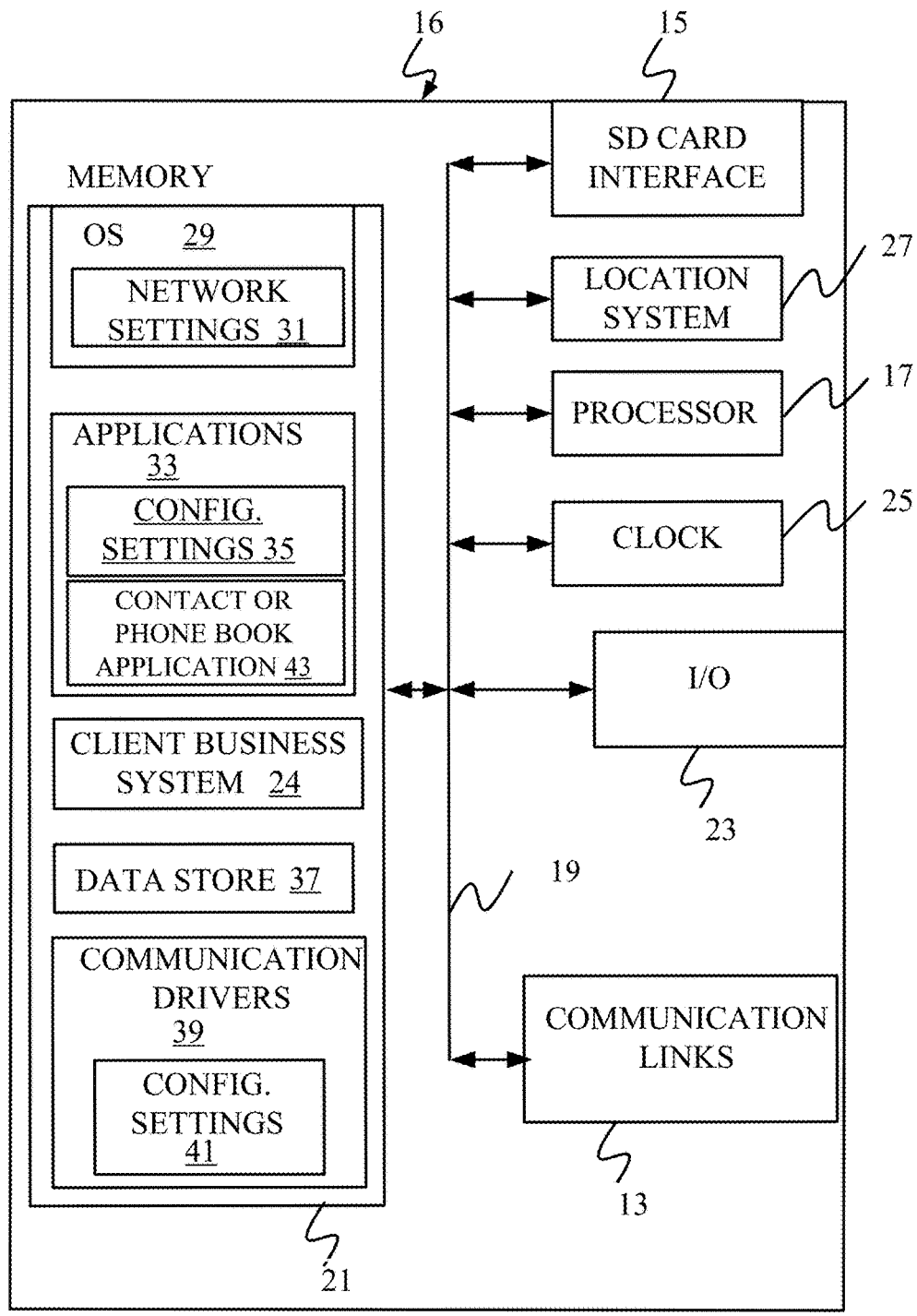
FIGS. 5-7 illustrate various mobile devices that can be used in the architectures shown in the previous figures.
Figure 6:
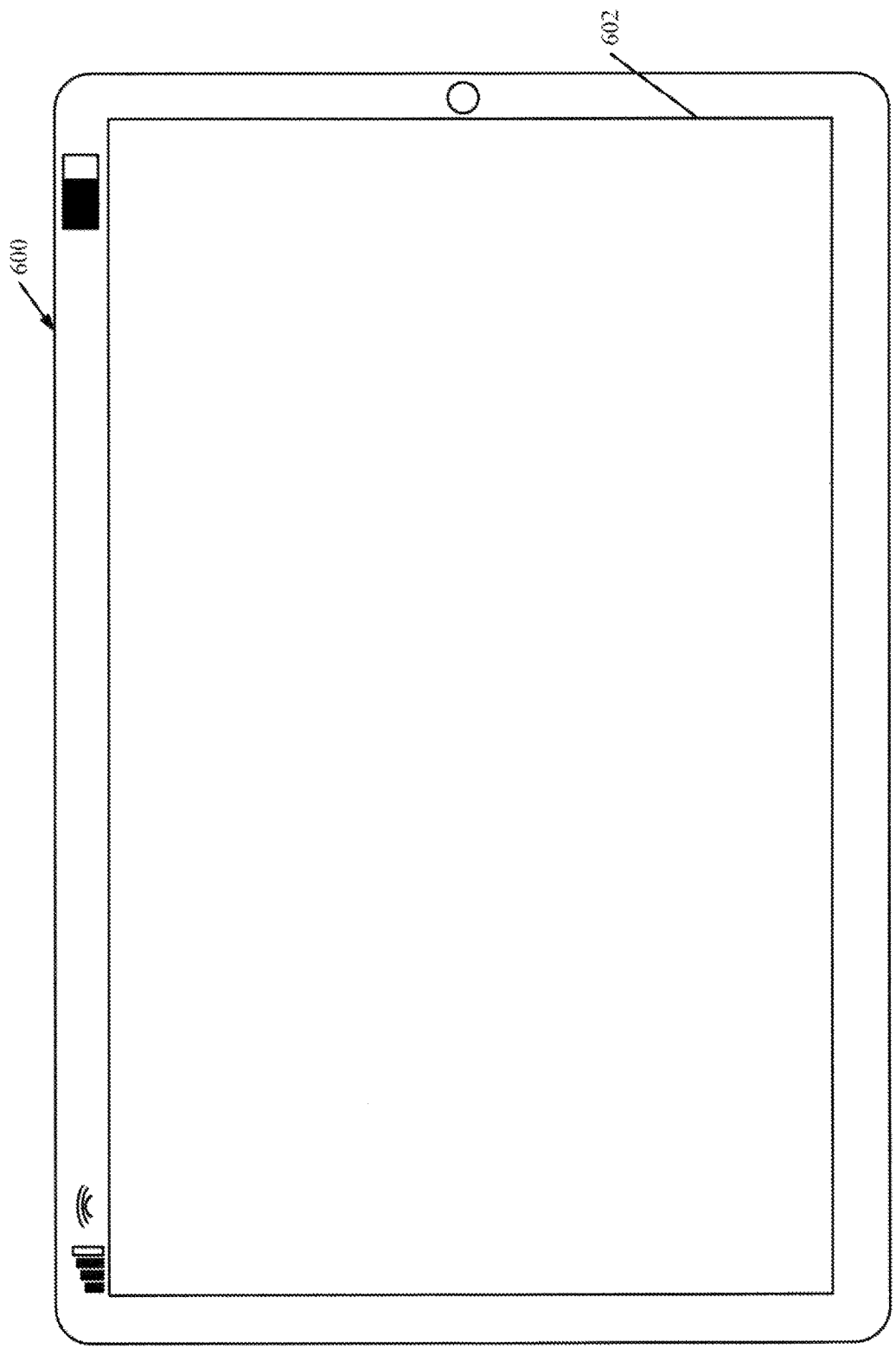
Figure 7:
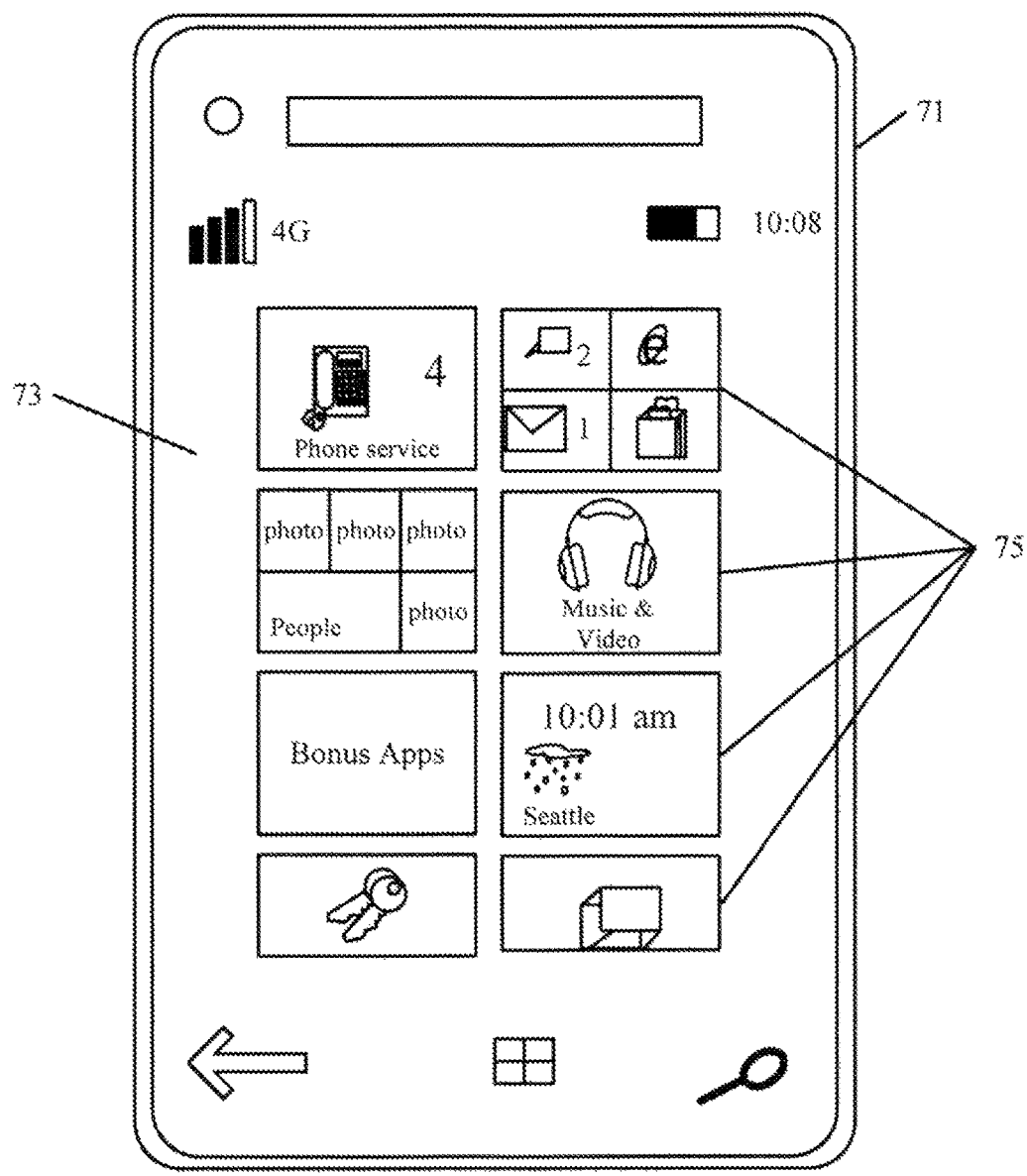

FIG. 5 is a simplified block diagram of one illustrative example of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components of architecture 120 or that interacts with architecture 120, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors from FIG. 2) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 120. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1×rtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
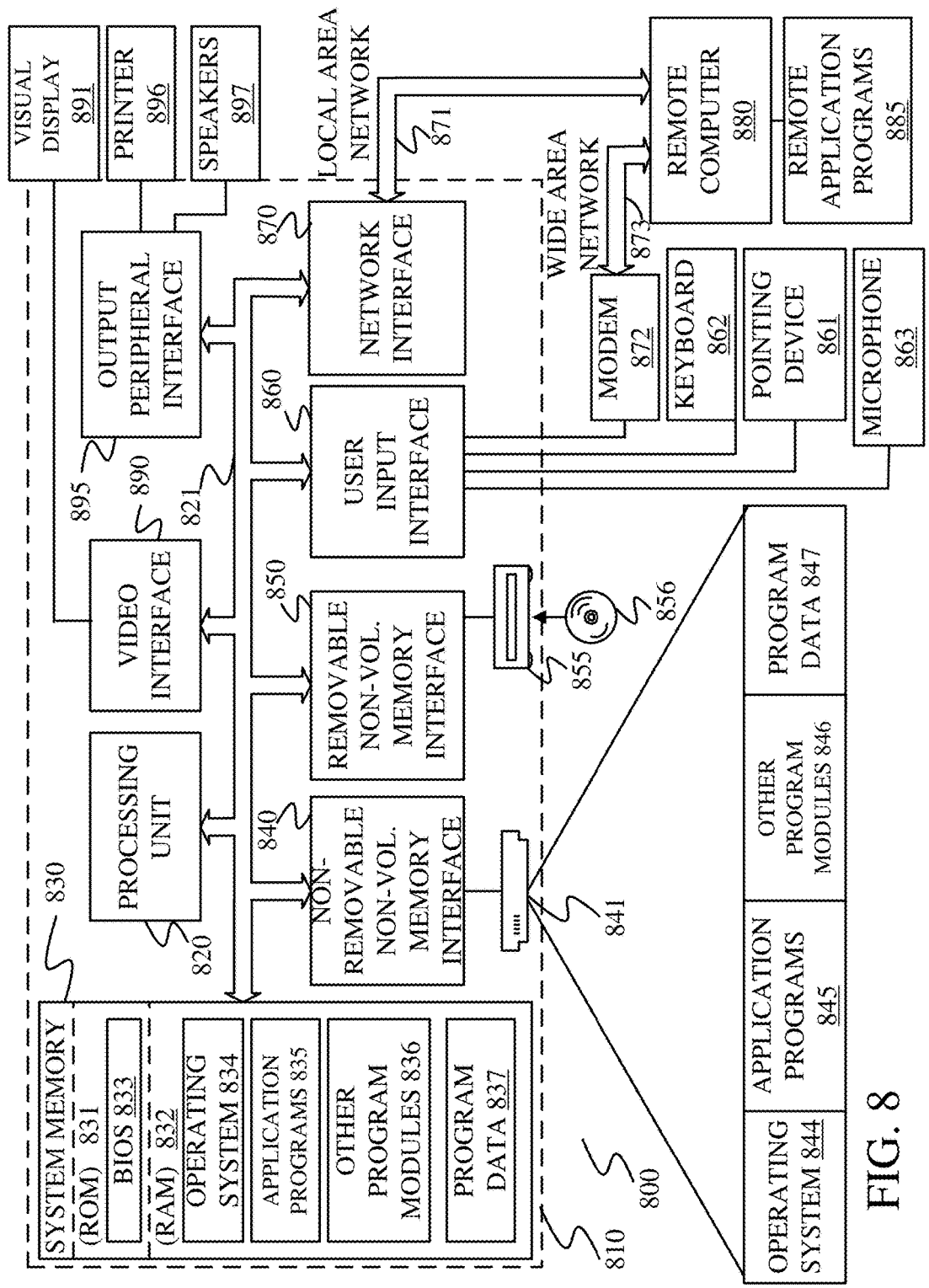
FIG. 8 is a block diagram of one example of a computing system environment that can be used in the architectures shown in the previous figures.

FIG. 8 is one example of a computing environment in which architecture 120, or parts of it, (for example) can be deployed. With reference to FIG. 8, an example system for implementing some embodiments includes a general-purpose computing device in the form of a computer 810. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 2 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

dropbox account identification logic that obtains electronic mail (e-mail) data indicative of a set of forwarding e-mail accounts, that are configured to forward messages to another e-mail account and identifies a dropbox e-mail account as an account that is a destination of forwarded messages from a threshold number of the forwarding e-mail accounts;

malicious collection account identifying logic that is configured to identify malicious collection e-mail accounts, based on the e-mail data identifying a subset of the forwarding e-mail accounts that forward messages to the identified dropbox e-mail account, and generate a malicious collection account identifier identifying the malicious collection e-mail accounts; and a resolution system that receives the malicious collection account identifier and performs a resolution action to resolve the malicious collection e-mail accounts based on the malicious collection account identifier.

Example 2 is the computing system of any or all previous examples and further comprising:

collection account identifying logic that accesses the e-mail data in a user account data store and identifies the set of forwarding e-mail accounts, as a set of collection accounts, based on the accessed data.

Example 3 is the computing system of any or all previous examples wherein the collection account identifying logic accesses forwarding status information associated with e-mail accounts identified in the e-mail data to identify the set of forwarding e-mail accounts.

Example 4 is the computing system of any or all previous examples and further comprising:

boundary identifying logic that is configured to identify a boundary in the user account data store that stores the e-mail data, the boundary delineating e-mail data in the user account data store that is accessed by the collection account identifying logic in identifying the set of collection accounts.

Example 5 is the computing system of any or all previous examples and further comprising:

threshold setting logic that is configured to identify a dropbox forwarding account threshold indicative of the threshold number of forwarding e-mail accounts.

Example 6 is the computing system of any or all previous examples wherein the threshold setting logic is configured to identify the dropbox forwarding account threshold based on a ratio of a number of e-mail accounts in the set of forwarding e-mail accounts to a number of dropbox e-mail accounts identified in the boundary.

Example 7 is the computing system of any or all previous examples wherein the threshold setting logic is configured to identify the dropbox forwarding account threshold based on a ratio of a total number of e-mail accounts in the boundary to a total number of forwarding e-mail accounts in the boundary.

Example 8 is the computing system of any or all previous examples wherein the threshold setting logic is configured to identify the dropbox forwarding account threshold based on a threshold number of unique dropbox e-mail accounts identified in the boundary.

Example 9 is the computing system of any or all previous examples wherein the resolution system comprises:

an account suspension system that is configured to automatically suspend the malicious collection e-mail accounts.

Example 10 is the computing system of any or all previous examples wherein the resolution system comprises:

an e-mail filtering configuration system that is configured to automatically reconfigure filtering information corresponding to the malicious collection e-mail accounts to inhibit forwarding of messages from the malicious collection e-mail accounts.

Example 11 is the computing system of any or all previous examples wherein the resolution system comprises:

a forwarding status removal system that is configured to automatically remove forwarding status information corresponding to the malicious collection e-mail accounts to inhibit forwarding of messages from the malicious collection e-mail accounts.

Example 12 is a computer implemented method, comprising:

obtaining electronic mail (e-mail) data indicative of a set of forwarding e-mail accounts, that are configured to forward messages to another e-mail account;

identifying a dropbox e-mail account as an account that is a destination of forwarded messages from a threshold number of the forwarding e-mail accounts;

identifying malicious collection e-mail accounts, based on the e-mail data identifying a subset of the forwarding e-mail accounts that forward messages to the identified dropbox e-mail account;

generating a malicious collection account identifier identifying the malicious collection e-mail accounts; and performing a resolution action to resolve the malicious collection e-mail accounts based on the malicious collection account identifier.

Example 13 is the computer implemented method of any or all previous examples and further comprising:

accesses forwarding status information associated with e-mail accounts identified in the e-mail data the e-mail data in a user account data store; and identifying the set of forwarding e-mail accounts, as a set of collection accounts, based on the accessed data.

Example 14 is the computer implemented method of any or all previous examples and further comprising:

identifying a boundary in the user account data store that stores the e-mail data, the boundary delineating e-mail data in the user account data store that is accessed in identifying the set of collection accounts.

Example 15 is the computer implemented method of any or all previous examples and further comprising:

identifying a dropbox forwarding account threshold indicative of the threshold number of forwarding e-mail accounts.

Example 16 is the computer implemented method of any or all previous examples wherein identifying the dropbox forwarding account threshold comprises:

determining a first ratio of a number of e-mail accounts in the set of forwarding e-mail accounts to a number of dropbox e-mail accounts identified in the boundary, a second ratio of a total number of e-mail accounts in the boundary to a total number of forwarding e-mail accounts in the boundary, and a threshold number of unique dropbox e-mail accounts identified in the boundary; and identifying the dropbox forwarding account threshold based on the first threshold, the second threshold and the threshold number of unique dropbox e-mail accounts identified in the boundary.

Example 17 is the computer implemented method of any or all previous examples wherein performing a resolution action comprises at least one of:

automatically suspending the malicious collection e-mail accounts;

automatically re-configuring filtering information corresponding to the malicious collection e-mail accounts to inhibit forwarding of messages from the malicious collection e-mail accounts; or automatically removing forwarding status information corresponding to the malicious collection e-mail accounts to inhibit forwarding of messages from the malicious collection e-mail accounts.

Example 18 is a computing system, comprising:

collection account identifying logic that accesses electronic mail (e-mail) data in a user account data store and identifies a set of forwarding e-mail accounts, that are configured to forward messages to another e-mail account, as a set of collection accounts, based on the accessed data and generates a collection account identifier output indicative of the set of collection accounts;

dropbox account identification logic that obtains the collection account identifier and identifies a dropbox e-mail account as an account that is a destination of forwarded messages from a threshold number of the forwarding e-mail accounts in the set of collection accounts;

malicious collection account identifying logic that is configured to identify malicious collection e-mail accounts, based on the e-mail data identifying a subset of the forwarding e-mail accounts that forward messages to the identified dropbox e-mail account, and generate a malicious collection account identifier identifying the malicious collection e-mail accounts; and a resolution system that receives the malicious collection account identifier and performs a resolution action to resolve the malicious collection e-mail accounts based on the malicious collection account identifier.

Example 19 is the computing system of any or all previous examples and further comprising:

boundary identifying logic that is configured to identify a boundary in the user account data store that stores the e-mail data, the boundary delineating e-mail data in the user account data store that is accessed by the collection account identifying logic in identifying the set of collection accounts; and threshold setting logic that is configured to identify a dropbox forwarding account threshold indicative of the threshold number of forwarding e-mail accounts.

Example 20 is the computing system of any or all previous examples wherein the resolution system comprises at least one of:

an account suspension system that is configured to automatically suspend the malicious collection e-mail accounts;

an e-mail filtering configuration system that is configured to automatically reconfigure filtering information corresponding to the malicious collection e-mail accounts to inhibit forwarding of messages from the malicious collection e-mail accounts; or a forwarding status removal system that is configured to automatically remove forwarding status information corresponding to the malicious collection e-mail accounts to inhibit forwarding of messages from the malicious collection e-mail accounts.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor; and
memory storing instructions executable by the processor, wherein the instructions, when executed, configure the computing system to:
based on electronic mail (e-mail) data, identify a set of forwarding e-mail accounts, that are each configured to forward messages to a particular e-mail account;
compare the number of forwarding e-mail accounts in the identified set to a threshold number;
based on the comparison, identify the particular e-mail account as a dropbox e-mail account that is a destination of forwarded messages from the threshold number of forwarding e-mail accounts;
identify, as malicious collection e-mail accounts, at least a subset of the forwarding e-mail accounts that forward messages to the identified dropbox e-mail account;
generate a malicious collection account identifier that identifies the malicious collection e-mail accounts; and
perform a resolution action to resolve the malicious collection e-mail accounts based on the malicious collection account identifier.

2. The computing system of claim 1 wherein the instructions configure the computing system to:
access the e-mail data in a user account data store; and
identify the set of forwarding e-mail accounts, as a set of collection accounts, based on the accessed data.

3. The computing system of claim 2 wherein the instructions configure the computing system to access forwarding status information associated with e-mail accounts identified in the e-mail data to identify the set of forwarding e-mail accounts.

4. The computing system of claim 2 wherein the instructions configure the computing system to:
identify a boundary in the user account data store that stores the e-mail data, the boundary delineating e-mail data in the user account data store that is accessed by the collection account identifying logic in identifying the set of collection accounts.

5. The computing system of claim 3 wherein the instructions configure the computing system to:
identify a dropbox forwarding account threshold indicative of the threshold number of forwarding e-mail accounts.

6. The computing system of claim 5 wherein the instructions configure the computing system to:
identify the dropbox forwarding account threshold based on a ratio of a number of e-mail accounts in the set of forwarding e-mail accounts to a number of dropbox e-mail accounts identified in the boundary.

7. The computing system of claim 6 wherein the instructions configure the computing system to:
identify the dropbox forwarding account threshold based on a ratio of a total number of e-mail accounts in the boundary to a total number of forwarding e-mail accounts in the boundary.

8. The computing system of claim 7 wherein the instructions configure the computing system to:
identify the dropbox forwarding account threshold based on a threshold number of unique dropbox e-mail accounts identified in the boundary.

9. The computing system of claim 1 wherein the resolution action comprises: automatically suspending the malicious collection e-mail accounts.

10. The computing system of claim 1 wherein the resolution action comprises automatically re-configuration filtering information corresponding to the malicious collection e-mail accounts to inhibit forwarding of messages from the malicious collection e-mail accounts.

11. The computing system of claim 1 wherein the resolution action comprises automatically removing forwarding status information corresponding to the malicious collection e-mail accounts to inhibit forwarding of messages from the malicious collection e-mail accounts.

12. A computer implemented method, comprising:
obtaining electronic mail (e-mail) data indicative of a set of forwarding e-mail accounts,
that are each configured to forward messages to particular e-mail account;
compare the number of forwarding e-mail accounts in the set to a threshold number;
based on the comparison, identifying the particular e-mail account as a dropbox e-mail account that is a destination of forwarded messages from the threshold number of the-forwarding e-mail accounts;
identifying, as malicious collection e-mail accounts, at least a subset of the forwarding e-mail accounts that forward messages to the identified dropbox e-mail account;
generating a malicious collection account identifier that identifies the malicious collection e-mail accounts; and
performing, by a resolution system device, a resolution action to resolve the malicious collection e-mail accounts based on the malicious collection account identifier.

13. The computer implemented method of claim 12 and further comprising:
accessing forwarding status information associated with e-mail accounts identified in the e-mail data the e-mail data in a user account data store; and
identifying the set of forwarding e-mail accounts, as a set of collection accounts, based on the accessed data.

14. The computer implemented method of claim 13 and further comprising:
identifying a boundary in the user account data store that stores the e-mail data, the boundary delineating e-mail data in the user account data store that is accessed in identifying the set of collection accounts.

15. The computer implemented method of claim 14 and further comprising:
identifying a dropbox forwarding account threshold indicative of the threshold number of forwarding e-mail accounts.

16. The computer implemented method of claim 15 wherein identifying the dropbox forwarding account threshold comprises:
determining a first ratio of a number of e-mail accounts in the set of forwarding e-mail accounts to a number of dropbox e-mail accounts identified in the boundary, a second ratio of a total number of e-mail accounts in the boundary to a total number of forwarding e-mail accounts in the boundary, and a threshold number of unique dropbox e-mail accounts identified in the boundary; and
identifying the dropbox forwarding account threshold based on the first threshold, the second threshold and the threshold number of unique dropbox e-mail accounts identified in the boundary.

17. The computer implemented method of claim 12 wherein performing a resolution action comprises at least one of:
automatically suspending the malicious collection e-mail accounts;
automatically re-configuring filtering information corresponding to the malicious collection e-mail accounts to inhibit forwarding of messages from the malicious collection e-mail accounts; or
automatically removing forwarding status information corresponding to the malicious collection e-mail accounts to inhibit forwarding of messages from the malicious collection e-mail accounts.

18. A computing system, comprising:
a processor; and
memory storing instructions executable by the processor, wherein the instructions, when executed, configure the computing system to provide:
a collection account identifying component configured to:
based on electronic mail (e-mail) data in a user account data store, identify, as a set of collection accounts, forwarding e-mail accounts that are each configured to forward messages to a particular e-mail account; and
generate a collection account identifier indicative of the set of collection accounts;
a dropbox account identification component configured to:
obtain the collection account identifier;
compare the number of accounts, in the set of collection accounts, to a threshold number;
based on the comparison, identify the particular e-mail account as a dropbox e-mail account that is a destination of forwarded messages from the threshold number of the forwarding e-mail accounts;
malicious collection account identifying component configured to:

identify, as malicious collection e-mail accounts, at least a subset of the forwarding e-mail accounts that forward messages to the identified dropbox e-mail account, and generate a malicious collection account identifier identifying the malicious collection e-mail accounts; and a resolution system configured to:

based on the malicious collection account identifier, perform a resolution action comprising at least one of:

automatically suspend the malicious collection e-mail accounts;

automatically re-configure filtering information corresponding to the malicious collection e-mail accounts to inhibit forwarding of messages from the malicious collection e-mail accounts; or automatically remove forwarding status information corresponding to the malicious collection e-mail accounts to inhibit forwarding of messages from the malicious collection e-mail accounts.

19. The computing system of claim 18 and further comprising:

boundary identifying logic that is configured to identify a boundary in the user account data store that stores the e-mail data, the boundary delineating e-mail data in the user account data store that is accessed by the collection account identifying logic in identifying the set of collection accounts; and threshold setting logic that is configured to identify a dropbox forwarding account threshold indicative of the threshold number of forwarding e-mail accounts.

* * * * *